US009519707B2

(12) United States Patent
Kemp et al.

(10) Patent No.: US 9,519,707 B2
(45) Date of Patent: *Dec. 13, 2016

(54) SYSTEM AND METHOD FOR TOPICAL DOCUMENT SEARCHING

(75) Inventors: Richard Douglas Kemp, Atlantic City, NJ (US); Philippe Grenet, New York, NY (US)

(73) Assignee: The Bureau of National Affairs, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,729

(22) Filed: Jun. 14, 2010

(65) Prior Publication Data
US 2010/0257161 A1    Oct. 7, 2010

Related U.S. Application Data

(63) Continuation of application No. 11/412,315, filed on Apr. 26, 2006.

(51) Int. Cl.
*G06F 17/30*    (2006.01)

(52) U.S. Cl.
CPC ... *G06F 17/30728* (2013.01); *G06F 17/30867* (2013.01)

(58) Field of Classification Search
CPC ............... G06F 17/30728; G06F 17/30867
See application file for complete search history.

(56) References Cited

U.S. PATENT DOCUMENTS

| 5,619,709 A | 4/1997 | Caid et al. ............ 715/209 |
| 5,640,553 A | 6/1997 | Schultz ............... 707/5 |
| 5,675,788 A | 10/1997 | Husick et al. ........ 707/104.1 |
| 5,717,914 A | 2/1998 | Husick et al. ............ 707/5 |
| 5,754,938 A | 5/1998 | Herz et al. .............. 725/116 |
| 5,754,939 A | 5/1998 | Herz et al. .............. 455/3.04 |

(Continued)

OTHER PUBLICATIONS

Garfield E: "Science Citation Index—A new Dimension in Indexing" Internet Citation, vol. 144, No. 3619, May 8, 1964 pp. 649-654.

(Continued)

*Primary Examiner* — Tarek Chbouki
(74) *Attorney, Agent, or Firm* — Chiesa Shahinian & Giantomasi PC

(57) ABSTRACT

Systems and methods are providing for searching for documents within topically-defined clusters. A search space is defined, starting with one or more source documents, by examining references from one documents to another and following the networks of references to some level of indirection. Depending on the embodiment, references may be followed from a document containing a reference to a referred-to document, or from a referred-to document to a document containing a reference, or both. Once a search space has been defined, a query is executed, and documents within the search space that satisfy the query parameters are identified.

In certain embodiments of the invention, the documents primarily relate to legal materials, and one or more source documents are associated with one or more topics within a topic directory. In such embodiments, a search query may be limited to one or more selected topics by executing the search query within a search space defined using the associated document or documents as the source.

24 Claims, 10 Drawing Sheets

(56) References Cited

U.S. PATENT DOCUMENTS

| | | | |
|---|---|---|---|
| 5,794,178 A | 8/1998 | Caid et al. ............... | 704/9 |
| 5,835,087 A | 11/1998 | Herz et al. ............... | 715/810 |
| 6,029,195 A | 2/2000 | Herz ........................ | 725/116 |
| 6,122,635 A | 9/2000 | Burakoff et al. .......... | 707/102 |
| 6,393,426 B1 | 5/2002 | Odom et al. .............. | 707/100 |
| 6,418,432 B1 | 7/2002 | Cohen et al. ............. | 707/5 |
| 6,460,036 B1 | 10/2002 | Herz ........................ | 707/10 |
| 6,636,848 B1* | 10/2003 | Aridor et al. ............. | 707/728 |
| 6,859,800 B1 | 2/2005 | Roche et al. ............. | 707/3 |
| 7,080,076 B1 | 7/2006 | Williamson et al. ...... | 707/9 |
| 7,181,438 B1 | 2/2007 | Szabo ....................... | 707/2 |
| 7,287,012 B2 | 10/2007 | Corston et al. ........... | 706/12 |
| 7,346,608 B2 | 3/2008 | Annau et al. .............. | 707/3 |
| 8,543,564 B2* | 9/2013 | Conrad et al. ............. | 707/708 |
| 2002/0007373 A1 | 1/2002 | Blair et al. ................ | 707/505 |
| 2002/0091661 A1 | 7/2002 | Anick et al. ............... | 707/1 |
| 2002/0188586 A1* | 12/2002 | Veale ........................ | 707/1 |
| 2003/0115187 A1* | 6/2003 | Bode et al. ................ | 707/3 |
| 2004/0054654 A1* | 3/2004 | Nomiyama et al. ....... | 707/1 |
| 2005/0108200 A1 | 5/2005 | Meik et al. | |
| 2005/0114130 A1 | 5/2005 | Java et al. ................. | 704/240 |
| 2005/0216443 A1 | 9/2005 | Morton et al. ............ | 707/3 |
| 2005/0256867 A1 | 11/2005 | Walther et al. ............ | 707/5 |
| 2006/0041608 A1 | 2/2006 | Miller et al. | |
| 2006/0235858 A1* | 10/2006 | Joshi et al. ................ | 707/100 |
| 2006/0271526 A1 | 11/2006 | Charnock et al. ........ | 707/3 |
| 2007/0130100 A1 | 6/2007 | Miller ....................... | 707/1 |
| 2007/0156636 A1 | 7/2007 | Norton et al. ............. | 707/1 |
| 2007/0156677 A1 | 7/2007 | Szabo ....................... | 707/5 |
| 2007/0172062 A1 | 7/2007 | Waldo et al. .............. | 380/252 |

OTHER PUBLICATIONS

Hearst M A et al: "Cat-A Cone: An Interactive Interface for Specifying Searched and Viewing Retreival Reseults Using a Large Category Hierarchy".

Supplemental European Search Report, Jul. 9, 2009, pp. 1-2.

Chung et al., "Thematic Mapping—from Unstructured Documents to Taxonomies," Proceedings of the 11th International Conference on Information and Knowledge Management, CIKM '02, Nov. 4-9, 2002, pp. 608-610.

Attardi et al., "Automatic Web Page Categorization by Link and Context Analysis," Proceedings of THAI-99, European Symposium on Telematics, Hypermedia and Artificial Intelligence (1999), Retrieved: Oct. 8, 2001, pp. 1-16.

* cited by examiner

402  VERIZON COMMUNICATIONS INC v. LAW
OFFICES OF CURTIS V. TRINKO LLP
Opinion of the Court

I

Petitioner Verizon Communications Inc. is the incumbent local exchange carrier (LEC) serving New York State. Before the 1996 Act, Verizon,[1] like other incumbent LECs, enjoyed an exclusive franchise within its local service area. The 1996 Act source to "uproo[t]" the incumbent LEC's monopoly and to introduce competition in its place. *Verizon Communications Inc. v. FCC*, 535 U.S. 467, 488 (2002). Central to the scheme of the Act is the incumbent LEC's obligation under 47 U.S.C. §251(c) to share its network with competitors, see *AT&T Corp. v. Iowa Utilities Bd.*, 525 U.S. 366, 371 (1999), including provision of access to individual elements of the network on "unbundled" basis. §251(c)(3). New entrants, so-called competitive LECs, resell these unbundled network elements (UNEs), recombined with each other or with elements belonging to the LECs.

Verizon, like other incumbent LECs, has taken two significant steps within the Act's framework in the direction of increased competition. first, Verizon has signed interconnection agreements with rivals such as AT&T, as it is obligated to do under §252, detailing the terms on which it will make its network elements available. (Because Verizon and AT&T could not agree on terms, the open issues were subjected to compulsory arbitration under §§251(b) and (c).) In 1997, the state regulator, New York's Public Service Commission (PSC) approved Verizon's interconnection agreement with AT&T.

Second, Verizon has taken advantage of the opportunity provided by the 1996 Act for incumbent LECs to enter the long-distance market (from which they had long been excluded). That required Verizon to satisfy, among other things, a 14-item checklist of statutory requirements, which

---

[1] In 1996, NYNEX was the incumbent LEC for New York State. NYNEX subsequently merged with Bell Atlantic Corporation, and the merged entity retained the Bell Atlantic Name; a further merger produced Verizon. We use "Verizon" to refer to NYNEX and Bell Atlantic as well.

(prior art)

Fig. 1

```
<p>Petitioner Verizon Communications Inc. is the incumbent
local exchange carrier (LEC) serving New York State. Before
the 1996 Act, Verizon,<sup>1</sup> like other incumbent
LECs, enjoyed an exclusive franchise within its local
service area. The 1996 Act sought to "uproo[t]" the
incumbent LECs' monopoly and to introduce competition
in its place.

<a href="http://www.law.cornell.edu/supct/html/00-511.ZS.html">
<i>Verizon Communications Inc. v. FCC</i>, 535 U. S. 467, 488
(2002)
</a>

Central to the scheme of the Act is the incumbent LEC's
obligation under
<a href="http://www.law.cornell.edu/uscode/47/251.shtml">47 U. S. C.
§ 251(c)</a>
to share its network with competitors, see
<a href="http://supct.law.cornell.edu/supct/html/97-826.ZS.html">
<i>AT&T Corp. v. Iowa Utilities Bd.</i>, 525 U. S.
366, 371 (1999)</a>
including provision of access to
individual elements of the network on an "unbundled"
basis.
<a href="http://www.law.cornell.edu/uscode/47/251.shtml">
§ 251(c)(3)</a>
New entrants, so-called competitive
LECs, resell these unbundled network elements (UNEs),
recombined with each other or with elements belonging to
the LECs.</p>
```

Fig. 2 (prior art)

SYSTEM AND METHOD FOR TOPICAL DOCUMENT SEARCHING

RELATED APPLICATIONS

This application is a Continuation of U.S. patent application Ser. No. 11/412,315, filed Apr. 26, 2006, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND

The invention disclosed herein relates to computerized searching for electronic data within collections of stored data, such as, e.g., documents.

Electronically stored data, or information, is now available in immense quantities, and the rate of growth is accelerating. Such data may be stored as logical units of various kinds, such as, e.g., documents, files, records, etc.

A simple example is the World Wide Web (the "Web"), a global information space comprising hyperlinked documents that are requested and distributed via the Internet. From its origin in 1990, the Web has grown such that a study conducted in January 2005 concluded that it comprised at least 11.5 billion indexable Web pages alone.

Specialized databases continue to grow as well. For example, electronic legal databases store, e.g., statutes, regulations, judicial opinions, and secondary sources and are constantly updated an expanded. Examples of such legal databases are described in commonly-owned U.S. patent application Ser. No. 10/045,586, filed on Jan. 11, 2002, and titled "DYNAMIC LEGAL DATABASE PROVIDING CURRENT AND HISTORICAL VERSIONS OF BODIES OF LAW," and commonly-owned U.S. patent application Ser. No. 10/603,207, filed on Jun. 25, 2003, and titled "ELECTRONIC MANAGEMENT AND DISTRIBUTION OF LEGAL INFORMATION," both of which are hereby incorporated by reference herein in their entirety.

Data stores of these sizes would not be useful without tools for searching for and retrieving desired information. Various types of search tools (commonly referred to as "search engines") are well-known. Typically, a search engine accepts a query from a user and then tries to identify all data that in some way corresponds to the query. A list of some or all matching logical units that contain data responsive to the query is provided to the user, who may then be able to retrieve some or all of the logical units.

The utility of a search tool, however, often depends on how well the user can formulate a query. For example, one query related to a topic may return little or no useful information, while a slightly different query may return hundreds, or even thousands, of hits, which may be far too many to examine. Users may waste considerable time in trial and error before stumbling upon a query that leads to a manageable number of relevant hits. In practice, a user may settle for a query known to be overinclusive and then waste additional time mining the results. Against this background, a user may wish to reduce the set of searchable data, and one approach is to limit the search to a subset comprising documents that are related to one another by topic.

BRIEF SUMMARY OF THE INVENTION

The invention provides for limiting a search of a data set, e.g., a collection of logical units such as documents, to a subset thereof, which may be referred to as a "search space." Membership in the subset may be determined by one or more relationships between and/or among the among the data, such as, e.g., relationship to one or more common topics. Embodiments of the invention provide for defining a topically-related data subset in which a search may be conducted for data responsive to a query.

According to embodiments of the invention, data in the data set contains references to other data in the data set, originating data is selected within the data set, and references to and/or from the originating data are used to define a subset of the data set within which a search may be conducted. In an embodiment of the invention, the subset comprises the originating data and data referred to by and/or referring to the originating data. In embodiments of the invention, the subset may comprise further data that is identifiable by iteratively following references to and/or from the originating data. For example, considering the data to be nodes in a graph, and further considering references to be edges in that graph, the originating data is represented by one or more originating nodes, the first iteration adds nodes at a distance of one from an originating node, the second adds nodes at a distance of two, and so on.

In an embodiment of the invention, a method is provided for defining a subset of a searchable data set, the method comprising defining the subset to include originating data and, for at least one iteration, further defining the subset to include the union of the data currently defined to be in the subset and all data to which any data currently defined to be in the subset contains at least one reference. In an embodiment of the invention, a method is provided for identifying data within a searchable data set, the method comprising defining a subset of a searchable data set, as before, and identifying data within the subset that satisfies one or more criteria of a specified search query. In a further embodiment of the invention, the originating data is associated with one or more topics, and the originating data is specified by selecting one or more topical areas for searching.

In an embodiment of the invention, a method is provided for defining a subset of a searchable data set, the method comprising defining the subset to include originating data and, for at least one iteration, further defining the subset to include the union of the data currently defined to be in the subset and all data known to contain a reference to any data currently defined to be in the subset. In an embodiment of the invention, a method is provided for identifying data within a searchable data set, the method comprising defining a subset of a searchable data set, as before, and identifying data within the subset that satisfies one or more criteria of a specified search query. In a further embodiment of the invention, the originating data is associated with one or more topics, and the originating data is specified by selecting one or more topical areas for searching.

Embodiments of the invention involve the use of references from one document to another to identify sets of documents likely to relate to one or more common topics and to limit a search of a larger data set to such a topical search space. Embodiments of the invention are described in more detail herein with respect to data in units arranged as documents. But as indicated above, the invention and the various embodiments thereof described herein apply equally to many other arrangements of data, including, for example, data arranged into logical units such as, e.g., files, records, etc. Also, embodiments of the invention are discussed in connection with databases of legal materials, but the invention and the various embodiments thereof disclosed herein apply generally to any sort of collection of data that may contain references to other data within the collection.

In an embodiment of the invention, a computerized system is provided for identifying one or more electronic documents within a collection of electronic documents, the system comprising at least one interface; and at least one processor coupled to the at least one interface and programmed to (1) accept a search query through one of the interfaces, (2) obtain a definition of a subset of a collection of electronic documents that comprises a plurality of electronic documents, (3) execute the search query within the subset, thereby obtaining any results responsive to the search query, and (4) provide any result or results through one of the interfaces. In such an embodiment, obtaining a definition of a subset comprises defining a subset to comprise (1) at least one source document within the collection, each of the source documents comprising at least one reference that identifies an additional document within the collection of documents, distinct from the source document, and (2) further additional documents identifiable by, for some number of iterations, for each additional document added to the subset in the immediately preceding iteration: (a) retrieving the additional document, (b) finding in the retrieved document one or more references, each of the one or more references identifying an additional document, and (c) adding each of the found references, not in the definition of the subset, to the definition of the subset. In a further embodiment of the invention, the subset comprises every electronic document within the collection that any electronic document within the subset comprises a reference to.

In an embodiment of the invention, a computerized system is provided for identifying one or more electronic documents within a collection of electronic documents, the system comprising at least one interface; and at least one processor coupled to the at least one interface and programmed to (1) accept a search query through one of the interfaces, (2) obtain a definition of a subset of a collection of electronic documents that comprises a plurality of electronic documents, (3) execute the search query within the subset, thereby obtaining any results responsive to the search query, and (4) provide at least one of the results through one of the interfaces. In such an embodiment, obtaining a definition of a subset comprises defining a subset to comprise (1) at least one source document within the collection, (2) additional citing documents identifiable by, for some number of iterations, for each document added to the subset in the immediately preceding iteration: (a) finding one or more additional citing documents in the collection, each comprising at least one reference to the document, and (b) adding each additional citing document, not already in the subset, to the subset. In a further embodiment of the invention, the subset comprises every electronic document within the collection that is known to comprise a reference to any electronic document within the subset.

In an embodiment of the invention, a method is provided for identifying one or more documents within a collection of documents, the method comprising defining a subset of a collection of documents, the collection of documents comprising a plurality of documents, and the subset comprising (1) at least one source document within the collection of documents, each source document comprising at least one reference that identifies an additional document within the collection of documents, distinct from the source document, (2) additional documents identifiable by, for some number of iterations, for each document added to the search space in the immediately preceding iteration: (a) retrieving the document, (b) finding in the retrieved document one or more references, each of the one or more references identifying an additional document, and (c) adding each of the found references, not already in the definition of the search space, to the definition of the search space; accepting a search query comprising one or more criteria; and identifying one or more documents within the subset that satisfy the one or more criteria comprised by the search query. In a further embodiment of the invention, the subset comprises every electronic document within the collection that any electronic document within the subset comprises a reference to.

In an embodiment of the invention, a method is provided for identifying one or more documents within a collection of documents, the method comprising defining a subset within a collection of documents, the collection of documents comprising a plurality of documents, and the subset comprising (1) at least one source document within the collection of documents, (2) additional citing documents identifiable by, for some number of iterations, for each document added to the subset in the immediately preceding iteration: (a) finding one or more additional citing documents each comprising at least one reference to the document, and (b) adding each additional citing document, not already in the subset, to the subset; accepting a search query comprising one or more criteria; and identifying one or more documents within the subset that satisfy the one or more criteria comprised by the search query. In a further embodiment of the invention, the subset comprises every electronic document within the collection that is known to comprise a reference to any electronic document within the subset.

In an embodiment of the invention, a method is provided for defining a topical subset of a collection of documents, the method comprising defining a subset of a collection of documents to comprise at least one source document within the collection of documents, each source document comprising at least one reference that identifies an additional document within the collection of documents, distinct from the source document, wherein this defining comprises a first iteration, and defining the subset to comprise additional documents identifiable by, for some number of iterations, for each document added to the search space in the immediately preceding iteration: (a) retrieving the document, (b) finding in the retrieved document one or more references, each of the one or more references identifying an additional document, and (c) adding each of the found references, not already in the definition of the search space, to the definition of the search space. In a further embodiment of the invention, the subset comprises every document within the collection that any document within the subset comprises a reference to.

In an embodiment of the invention, a method is provided for defining a topical subset of a collection of documents, the method comprising defining a subset of a collection of documents to comprise at least one source document within the collection of documents, such defining constituting a first iteration; defining the subset to comprise at least one additional document identifiable by, for some number of iterations, for each document added to the subset in the immediately preceding iteration: (a) finding one or more additional citing documents within the collection of documents, each additional citing document comprising one or more references to the document, and (b) adding each of the additional citing documents to the subset. In a further embodiment of the invention, the subset comprises every document within the collection that is known to comprise a reference to any document within the subset.

In some embodiments of the invention, at least one of the source documents pertains to at least one area of law. In some further embodiments of the invention, the provided method comprises selecting at least one topic from a directory of areas of law, wherein each source document pertains to at least one of the selected topics.

BRIEF DESCRIPTION OF THE DRAWINGS

The invention is illustrated in the figures of the accompanying drawings, which are meant to be exemplary and not limiting, and in which like references are intended to refer to like or corresponding things.

FIG. 1 is an excerpt from a textual document that contains citations according to the prior art.

FIG. 2 is an excerpt from an HTML document that contains hyperlinks according to the prior art.

DETAILED DESCRIPTION OF PREFERRED EMBODIMENTS

Embodiments of the invention relate to searching for electronic documents according to one or more criteria. Many aspects of the invention and of particular embodiments of the invention are discussed herein in connection with legal documents, including, e.g., judicial opinions, statutes, and secondary sources such as legal treatises and case annotations. The discussion of legal documents is provided purely as an example, however, and does not limit the scope of the invention. It will be recognized by those skilled in the relevant arts that the subject matter of the invention is applicable to documents of widely varied types.

A document may be considered a container of data that may be indexed and/or retrieved as a unit in a data management system. Although it is common for a document to be a single computer file, this need not be the case. It is well known for a document to comprise several files: for example, a page on the World Wide Web may be considered a single document, but it can comprise resources stored in several files. Conversely, it is also well known for a file to comprise several documents: for example, in a database management system, multiple documents may be stored as records within a single file.

An electronic document may comprise digital data representing one or more types of information. (As a shorthand, it may be said herein that the document contains or comprises the information.) For instance, documents commonly comprise human-readable text, but may also comprise recorded sound, still and/or moving pictures, and/or other types of information in addition to or instead of text. A document may also comprise data intended for automatic processing, such as, e.g., formatting codes and/or markup in a language such as, e.g., XML or HTML.

A document may refer to one or more other documents. Such a reference may take the form of text intended to specify the referred-to document with sufficient precision that a human reader is able to identify the referred-to document unambiguously. Such a reference may sometimes be called a "citation," a document containing a citation may be referred to as a "citing document," and the document specified by the citation may be referred to as a "cited document."

Standard forms exist for human-readable citations. Well-known standards are published by the Modern Language Association, the American Psychological Association, and the University of Chicago Press. Legal documents often adhere to the conventions described in The Bluebook: A Uniform System of Citation (Columbia Law Review Ass'n et al. eds., 17th ed. 2000) or Association of Legal Writing Directors, ALWD Citation Manual: a Professional System of Citation (Darby Dickerson ed., 2d ed. 2002).

Figure 1A:
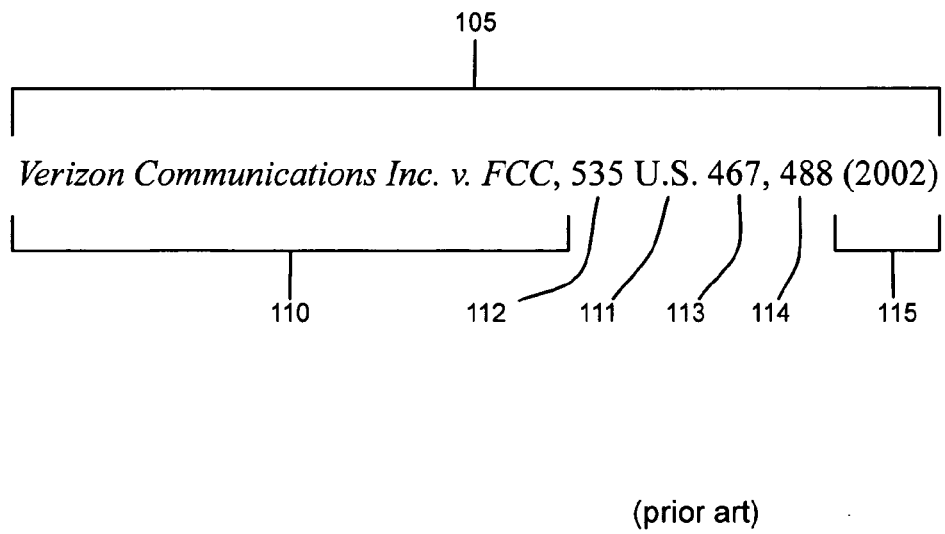
FIGS. 1a and 1b are additional views of citations that appear in FIG. 1.

FIG. 1 contains a fragment 100 of a document containing legal citations 105, 106 in a standard style. A case citation 105 refers to an opinion or other document issued by a court. FIG. 1a depicts the parts of the case citation 105. As depicted, the case citation 105 comprises a title 110, which often comprises the names of one or more parties to the action, an abbreviation 111 identifying the series of volumes (often called a "reporter") in which the opinion is published, the number 112 of the specific volume in which the opinion appears, and the first page 113 of the opinion within the volume. A court opinion is often cited as authority for a particular proposition of law, and a case citation 105 may therefore also comprise a "jump cite" 114 that indicates the page or pages on which the opinion provides that authority. A case citation 105 commonly also comprises the date 115 on which the court rendered the opinion.

Other information may appear in a case citation 105 in addition to and/or instead of the information depicted in FIG. 1a. For example, when not clear from the identity of the reporter, the case citation 150 may indicate the court that rendered the cited opinion. For another example, if an opinion is published in more than one reporter, the case citation 150 may indicate the multiple publications by including "parallel citations" (not pictured).

The case citation 105 depicted in FIG. 1a is sometimes referred to as a "long form" citation. Abbreviated forms of citation (not pictured) exist and sometimes follow the long form citation when the same document is cited more than once.

Figure 1B:
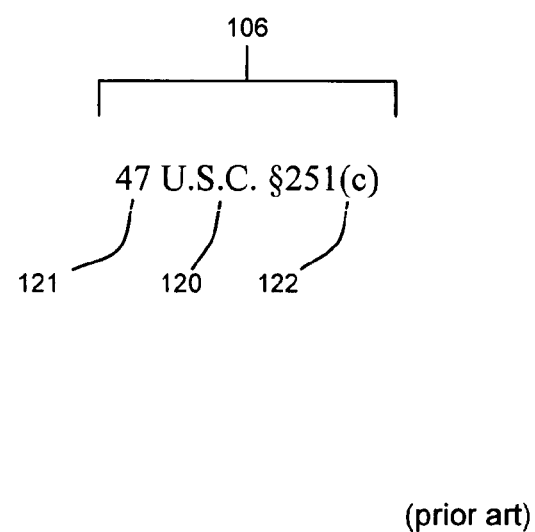

A statutory citation 106 identifies one or more sections of law. As depicted in FIG. 1b, the statutory citation 106 identifies a code of laws 120 into which the particular section has been codified, the title 121 within the code that contains the cited material, and one or more sections or parts of sections 122 within that title. Other information may appear in a statutory citation 106 in addition to and/or instead of the information depicted in FIG. 1b, such as, e.g., the year in which the code was published, the name of the Act containing the section, etc.

Standard forms exist for citing many other types of documents. Style manuals commonly prescribe long forms and abbreviated forms for citing nearly every type of document that a legal document might refer to.

The citation forms depicted in FIGS. 1, 1a, and 1b were developed for use by human readers. Although computers can be and have been programmed to recognize these forms in electronic documents, other kinds of references are often used when intended for electronic processing. FIG. 2 depicts the use of one type of machine-readable reference, called a "hyperlink," that may be used in conjunction with, e.g., the World Wide Web.

The document 130 has been marked up using the HyperText Markup Language ("HTML"). Plain text 134 is marked up with tags 135, 137-38, 140, which delimit one or more elements and may indicate, e.g., the structure of the document 130, the meaning or significance of one or more portions of the document 130, and/or the appearance and/or layout of elements that are to be presented to a user by a user agent, such as, e.g., a Web browser.

In HTML, a reference to any resource (which may be another HTML document, but need not be) may be comprised by an element called an "anchor" 136. Each anchor is delimited by a start tag 137 and an end tag 138. The start tag 137 comprises an element name 139 (which, for an anchor, is always "a") and, as depicted in FIG. 2, an "href" attribute 141, which is used to specify the target of the reference. The value 142 of the href attribute 141 is a Uniform Resource Locator ("URL") which identifies the target for electronic retrieval and which implicitly or explicitly specifies the protocol by which the resource may be retrieved, the server from which the resource may be retrieved, and the path to the resource on the server. A start tag 137 for an anchor element 136 may comprise other attributes (not pictured) in addition to and/or instead of the href attribute 141.

Between the start tag 137 and the end tag 138 of an anchor element 136 is the body 143 of the element 136. A Web browser will typically display only the body 143 of the element, but commonly will highlight or otherwise alter the appearance of text and/or other content within the body 143 to indicate that it is a hyperlink. When the user selects the hyperlink, e.g., by moving the pointer to the displayed body and then clicking the button on the pointing device, the Web browser attempts to retrieve the hyperlinked resource and present it to the user.

As depicted in FIG. 2, the body 143 of the anchor element 136 is a citation. This kind of relationship is common in hyperlinked documents, such as, e.g., Web pages. The human-readable text indicates that another document is being referred to, while the enclosing markup provides information that an automatic system can use to retrieve the document for presentation to the user. This kind of relationship is merely a conventional usage, however, and it is well known in the art that the body 143 of an anchor element 136 need not be a human-readable reference or citation, but may be any text, image, and/or other content.

An HTML document contains other tags besides those 137, 138 associated with anchor elements 136. As depicted in FIG. 2, for example, the HTML fragment include tags 135 delimiting the beginning and end of a paragraph and other tags 140 indicating the beginning and end of a range of text that is to be presented to the user in an italic typeface.

Figure 3:
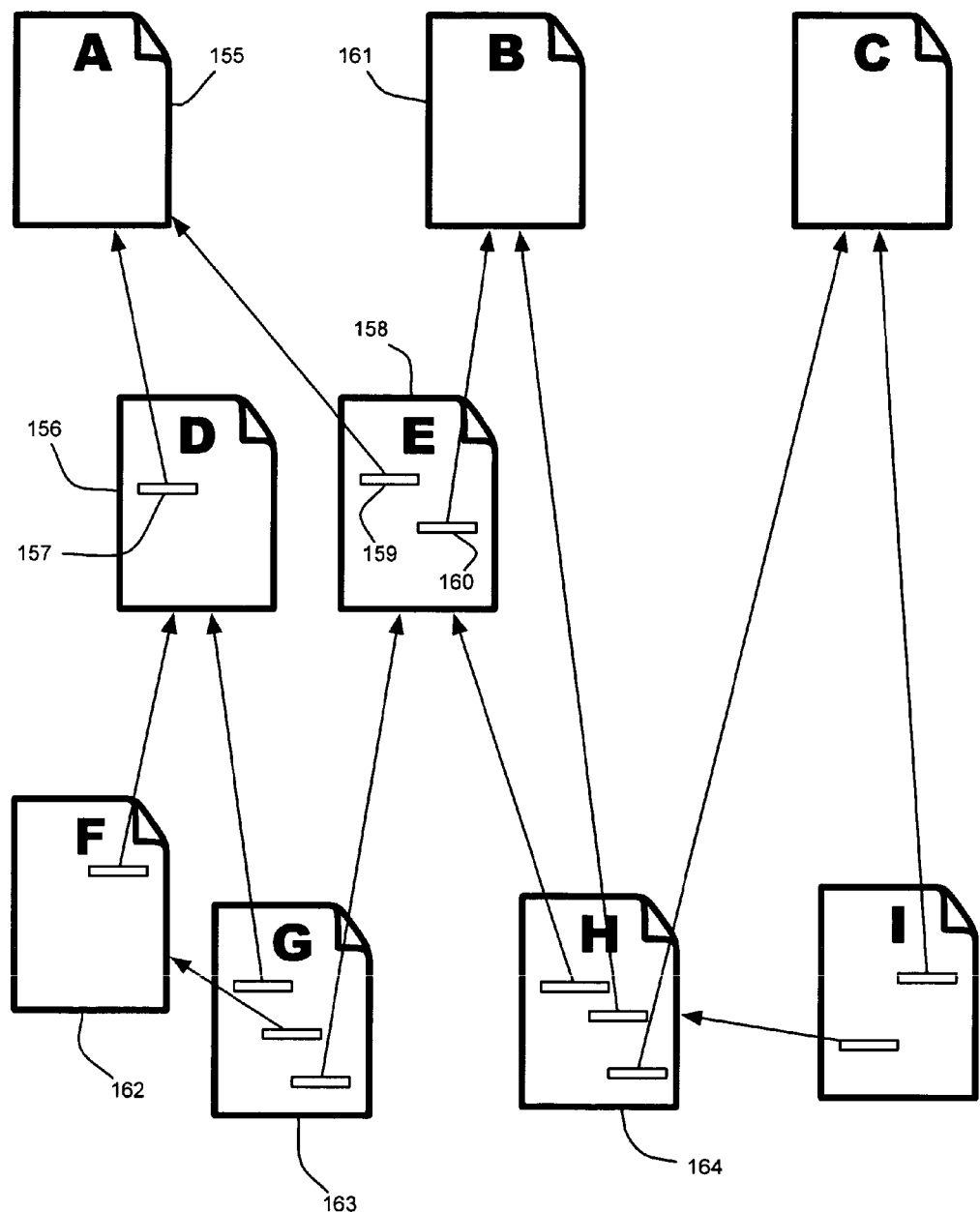
FIG. 3 depicts possible relationships between documents according to the prior art.

FIG. 3 depicts a small collection of documents, some of which refer to other documents. In connection with this example, the references may be considered machine-readable references, human-readable citations, or both. For example, as depicted in FIG. 3, document A 155 cites no other documents. In the legal context, sections of statutes, for example, often contain no citations. In contrast, document D 156 comprises a citation 157 to document A 155, and document E 158 comprises a citation 159 to document A 155 and another citation 160 to document B 161.

Figure 4:
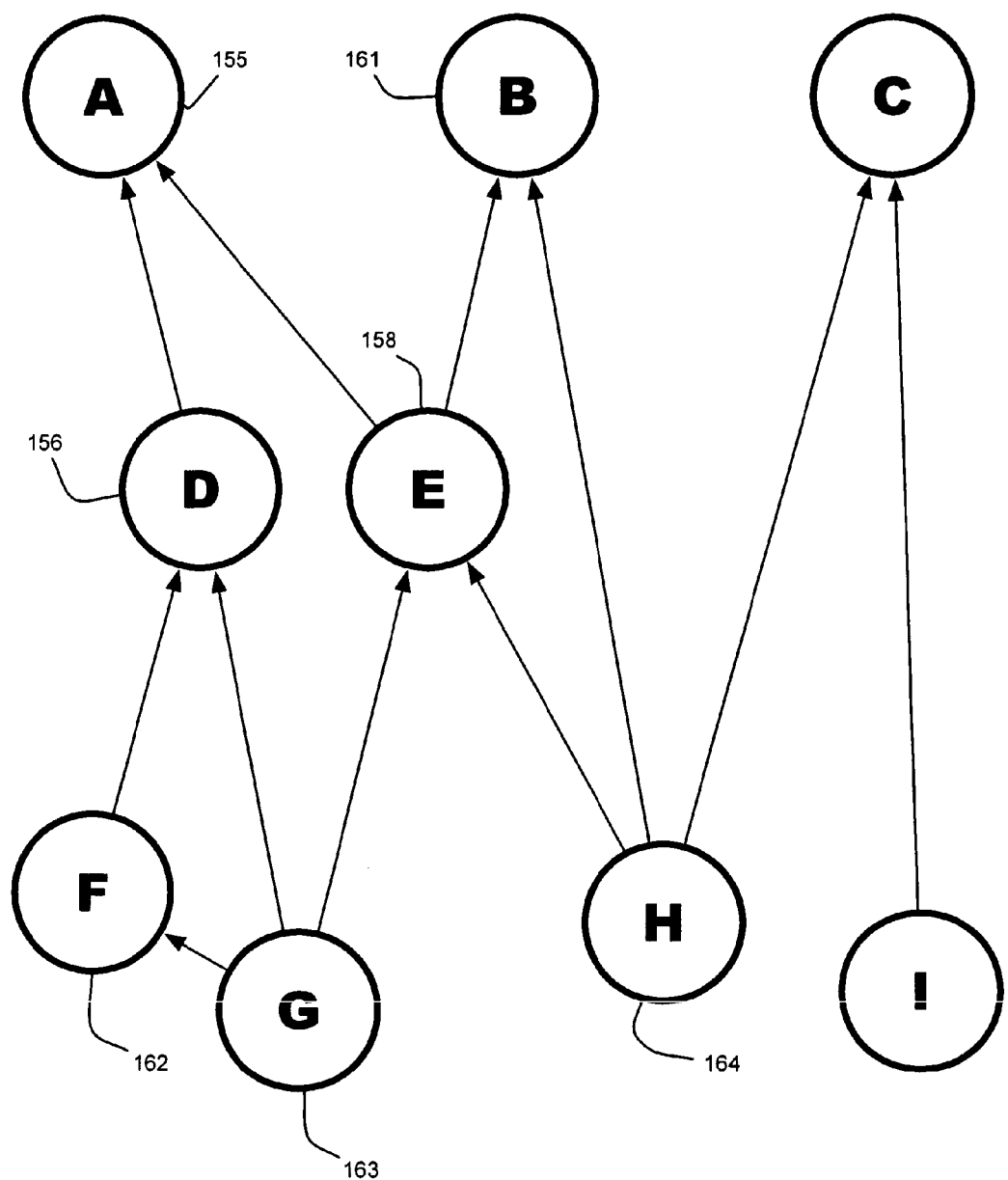
FIG. 4 depicts the relationships of FIG. 3 as a directed graph.

Documents and their references may be considered elements of a directed graph, as that term is used in computer science, in which each node represents a document, and a reference is represented by an edge from the node representing the citing document to the node representing the cited document. FIG. 4 depicts the documents and relationships of FIG. 3 as a directed graph corresponding to a hypothetical collection of legal documents that cite each other. The documents may comprise any kind of legal source material, including, e.g., judicial opinions, statutes, regulations, treatises, articles in legal journals, etc.

The graph of FIG. 4 has no cycles. In other words, if one starts at any document in FIG. 4, one cannot follow the trail of citations back to the original document. This property may hold if all documents are, for example, judicial opinions, because an opinion is written at a specific time and, logically, may cite only earlier-published opinions. This property need not obtain for all types of documents, however. For example, secondary legal sources often cross-reference one another. For another example, a Web page may comprise a hyperlink to a second page that in turn comprises a hyperlink to the first page. Such cycles are common, e.g., within a Web site, when multiple pages link to one another as an aid to navigating the site.

A reference from one document to another may suggest that the documents concern the same or related subjects. For example, as a matter of common practice, a hyperlink is inserted into a Web page to provide a link to a document that provides further information about something included within the referring page. For another example, in the legal field, an opinion or a treatise, for example, will typically cite at least one authority for every legal point it makes. Such an authority may be mandatory, such as a statute or a binding decision of an appellate court, or it may be persuasive, such as an opinion of a court in another jurisdiction. As a matter of good practice, though, the author of a document will typically cite the strongest, most relevant authority available for any particular point of law.

Accordingly, in embodiments of the invention, references between documents are used to define clusters of documents that are likely to concern one or more related topics. A search space may then be constructed that is limited, in whole or in part, to one or more such clusters. (A collection of one or more references may be considered a definition of the search space comprising the referred-to documents.)

In an embodiment of the invention, a search space is defined comprising a source document and all documents cited in the source document. For example, in connection with FIG. 3, if document E 158 is used as the source document, then the search space will comprise document E 158, document A 155, and document B 161. If a search of the collection 150 is limited to this search space, then the results will comprise matching documents only from this subset, assuming any such matching documents exist.

A search space can be defined iteratively, retrieving further cites from one or more cited documents. Starting with, for example, document G 163, that document refers to document D 156, document E 158, and document F 162, and these four documents may be regarded as the level 1 search space. Document D 156 in turn refers to document A 155, and document E 158 refers to document B 161, and therefore the level 2 search space consists of the documents in the level 1 search space plus document A 155 and document B 161.

A document may be encountered multiple times, and possibly on multiple levels, as the search space is constructed. For example, starting with document H 164, the level 1 search space comprises document E 158 and document B 161. Document E 158 refers to document B 161, however, so document B 161 may be encountered again when constructing the level 2 search space from the level 1 search space. But since document B 161 has already been included in the level 1 search space, the further encounters are not significant and may be disregarded in an embodiment of the invention.

In the general case, according to an embodiment of the invention, a search space of level N will consist of a source document and all documents that can be reached from it by following a chain of N or fewer references. To use the language of graph theory, a search space of level N will consist of the source document and all documents corresponding to nodes at a distance of N or less from the node corresponding to the source document, where each edge in the graph is directed and corresponds to a reference in one document to another.

Figure 5:
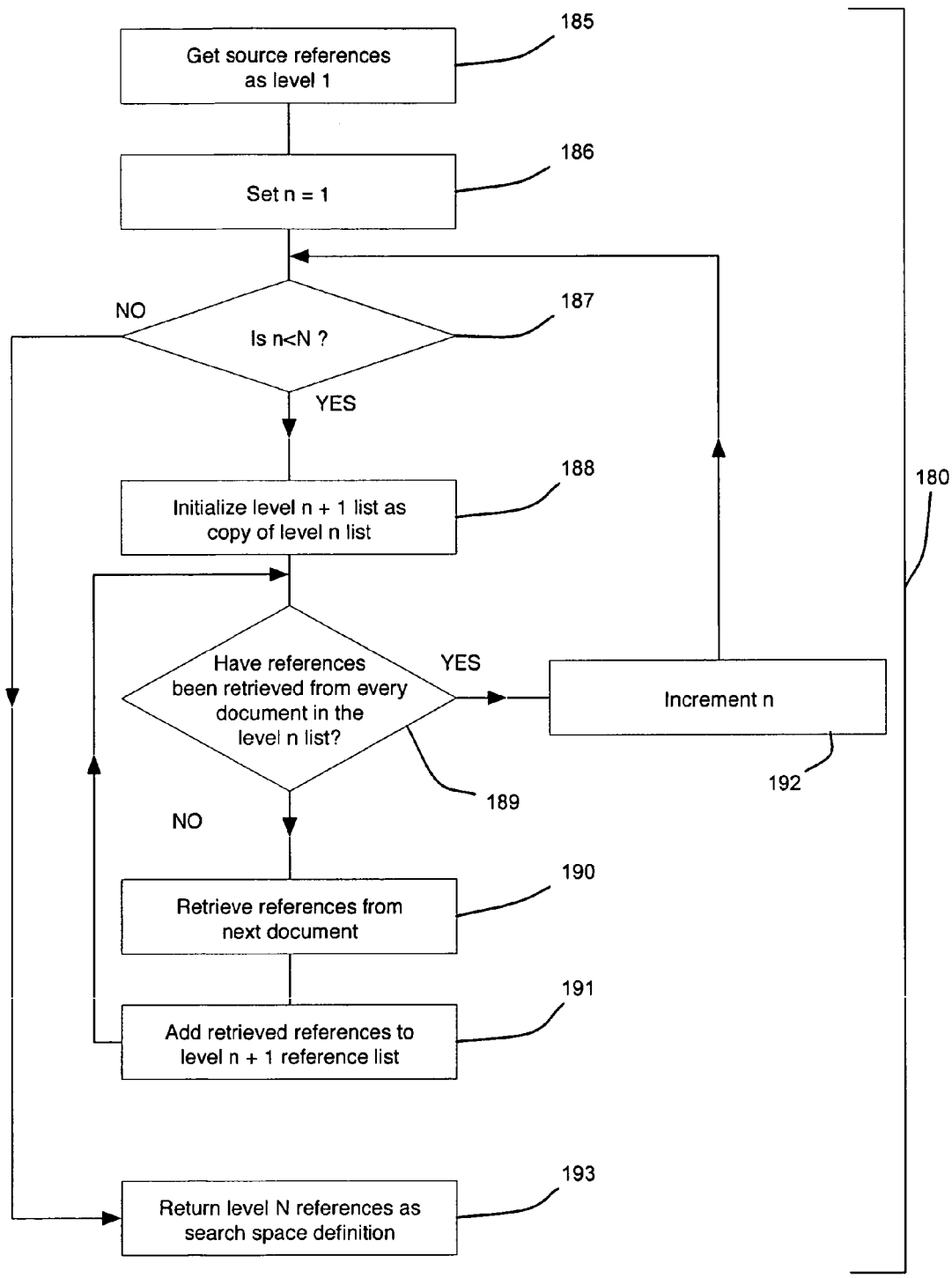
FIG. 5 depicts creating an N-level search space according to an embodiment of the invention.

FIG. 5 depicts generating 180 a level N search space according to an embodiment of the invention. In block 185, all references in a source document are identified. The way in which this is done may vary substantially depending on the nature and/or representation of the document and/or the design of the system that carries out this identification.

In an embodiment of the invention, a source document may comprise references only in the form of human-readable citations, such as, e.g., the document 100 depicted in FIG. 1. In such an embodiment, identifying references 185 may comprise use of software programmed to recognize patterns of characters corresponding to known citation forms, possibly including commonly used standard and/or nonstandard variants. Such software may take a document as input and then store the found citations, e.g., in a data structure.

In an embodiment of the invention, a source document may comprise computer-readable references, such as, e.g., those comprised by anchor elements 136 (FIG. 2) in an HTML document 130 (FIG. 2). XML may also be used to embed computer-readable references in a document in connection with an embodiment of the invention. Many other ways to encode computer-readable references are possible and will be apparent to those skilled in the art. In an embodiment of the invention, identifying references 185 may comprise use of software to read computer-readable references encoded in a document and then store the found references, e.g., in a data structure.

In an embodiment of the invention, identifying references 185 in a document may take place substantially prior to use of that document in constructing a search space. For example, in an embodiment of the invention, the references in an document may be identified automatically when the document is first introduced to the system, when the document is indexed for use with a search engine, and/or when the document is revised, among other possibilities. In an embodiment of the invention, one or more references in a document may be identified by a human editor who inputs the reference or references into, e.g., a data structure.

In an embodiment of the invention, some or all references may be normalized. Such normalization may, e.g., identify variant forms of references to the same document and thereby treat any occurrence of any variant as identical to any other occurrence of any variant. Normalizing references in this way may improve the efficiency of constructing the search space by limiting redundant processing of documents and/or references.

The references so identified may be stored persistently, e.g., in a database management system, and then retrieved in connection with constructing 180 a search space.

In an embodiment of the invention, a main iterative process is used to construct the search space, with the number of iterations being N, the desired level of the search space. In block 186, a counter is set to indicate the current iteration. Retrieving the references from the source document may be considered the first iteration, so, as depicted in FIG. 4, the counter n is given the initial value of 1 in block 186. Iteration proceeds until n equals N, and this condition is checked for in block 187.

In the depicted embodiment of the invention, constructing the level n+1 search space begins with all references defining the level n search space. This may be implemented by, for example, copying a data structure holding the references that define the level n search space to a new data structure that will hold the references that define the level n+1 search space, as in block 188.

Blocks 189, 190, and 191 represent a subsidiary iterative process inside the main one. In block 189, a check takes place that determines whether the references have been retrieved for every document in the level n search space. If not, references from the next unexamined document are retrieved in block 190. In an embodiment of the invention, retrieval of references in block 190 may be similar to retrieval of references from the source document in block 185.

In block 191, each reference that has been retrieved from the current document but is not yet part of the definition of the level n+1 search space is added to that definition. Flow then returns to block 189, where a check for additional unexamined documents takes place. In an embodiment of the invention, this subsidiary process ends when the references have been retrieved for every document in the level n search space.

Once references have been retrieved from all documents comprised by the definition of the level n search space, the counter n is incremented in block 192, completing a single pass through the main iterative process. The check in block 187 is then repeated to determine if additional passes are necessary. If no additional passes are necessary, the definition of the level N search space is made available in block 193 for use in a search.

In alternative embodiments of the invention, some references may be excluded from the definition of a search space, and/or some documents may not be examined for references. In some cases, for example, a reference may not be added because it is not recognized or because it refers to a document that is not indexed for searching. References may not be retrieved from a document because, for example, the document itself cannot be retrieved or, once retrieved, is in a form that cannot be examined for citations.

In an embodiment of the invention, it may be possible to specify one or more classes of documents and/or references to be excluded from the process. For example, when used to construct a search space of legal documents, statutes and/or judicial opinions from foreign jurisdictions and/or references to such documents may be ignored in an embodiment of the invention.

In an embodiment of the invention, information may be recorded about some or all relationships between and/or among documents in a search space, and such information may be used in connection with searches of the space. For example, the number of references in a first document to a second document may be recorded if it is believed that the number of references correlates with the degree of relevance between the two documents. In connection with a search space of level 2 or more, the level at which a document was added to the search space may be considered an indicator of the relevance of the document. Other properties of the reference graph, the documents, and/or the references may also be recorded, and, in an embodiment of the invention, some or all of the factors may be used to order the results of a search of any search space.

Figure 6:
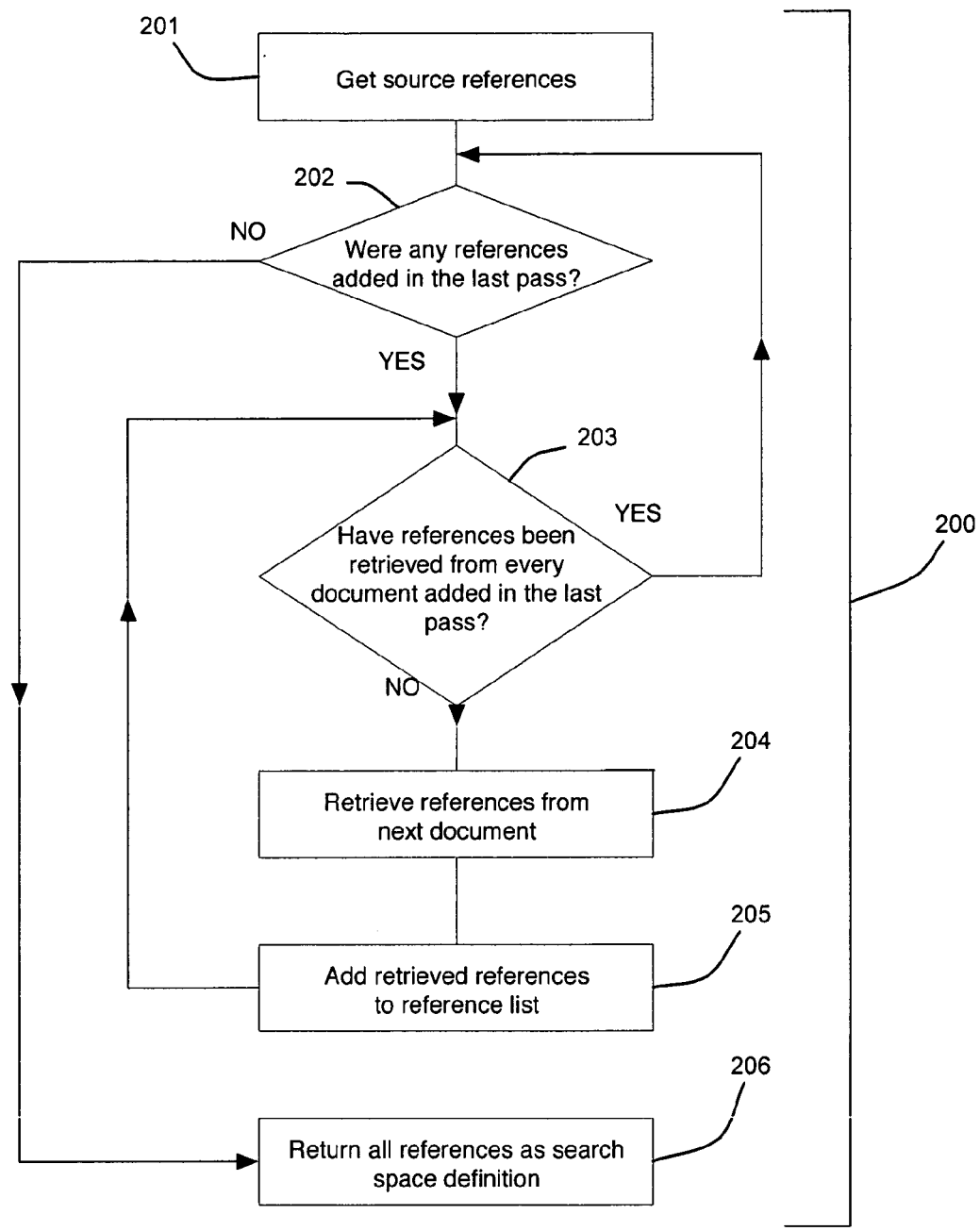
FIG. 6 depicts creating an exhaustive search space according to an embodiment of the invention.

Depending on, e.g., the nature of the documents, the size of the collection, and the ways in which documents in the collection refer to one another, it may be practical to define an exhaustive search space comprising every document directly or indirectly referred to in a source document. FIG. 6 depicts defining 200 an exhaustive search space according to an embodiment of the invention.

As before, defining 200 the exhaustive search space may in an embodiment of the invention be an iterative process that begins in block 201 with retrieving the references found in a source document. Because the search is exhaustive, it ends when no references can be found besides those already in the definition of the search space. This terminating condition is checked for in block 202.

In blocks 203, 204, and 205, the references from each of the documents added to the search space in the previous pass are added to the definition of the search space. The determination is made in block 203 whether any documents remain for which the references have to be added. If so, the references from the next document are retrieved in block 204 and added to the definition of the search set in block 205. The check in block 203 is then repeated.

Once references have been retrieved from each document added during the previous pass, the check in block 202 is repeated. If the latest pass did not increase the size of the search space, then the exhaustive search space has been successfully defined, and, in block 206, its definition is made available for use in searching.

In an embodiment of the invention, the definition 200 of the exhaustive search space may be interrupted if the process exceeds a preset running time and/or if the search space exceeds a preset size.

So far, the invention has been discussed in connection with an embodiment that builds a search space by moving from referring documents to referenced documents, but the invention is not limited to such embodiments. In embodiments of the invention, a document collection may be indexed so that references between documents are stored, e.g., in a database. In such an embodiment, retrieving the references from a document may comprise submitting a query to the database that requests all references comprised by the source document.

In another such embodiment, however, it is possible to traverse the graph in the opposite direction, e.g., by submitting a database query that identifies all documents that refer to a source document. Referring to FIG. 3 and taking, for example, document B 161 as the source document, the level 1 search space comprises document B 161, document E 158, and document H 164. The level 2 search space additionally comprises document G 163.

Depending on the embodiment of the invention and the nature of the searchable data collection, it may be impossible, impractical, or undesirable to identify all documents that hold references to a particular document. For example, identifying all Web pages that link to any particular page may not be practical, but such references may be recorded as individual pages are indexed for search. Such indexing of web references is done by, for example, the Google™ Internet search engine.

In a legal context, a search space so constructed may comprise, e.g., lines of decisions and/or analysis based on a significant statute or judicial opinion.

In an embodiment of the invention, a search space may be defined by traversing the graph in either or both directions. In some further embodiments of the invention, a user may choose the type of search space desired.

It will be appreciated by those skilled in the art that there are many ways to implement searching in a search space such as is built in an embodiment of the invention. For example, tools for searching within collections of textual data are well known in the art and are available from commercial suppliers. One such tool is Oracle® Text, which supports text searching combined with ordinary database searching in a single SQL statement.

Thus, in an embodiment of the invention, a relational database management system comprises one or more documents stored so as to allow each document to be associated with metadata. After a search space is constructed, the metadata associated with each document in the search space is modified to indicate such membership. (In an embodiment of the invention, a document can be included in multiple search spaces simultaneously.) When a search query is received for a given search space, the query is transformed into a SQL statement that specifies a textual search, limited to documents already identified in their associated metadata as part of the search space.

Figure 7:
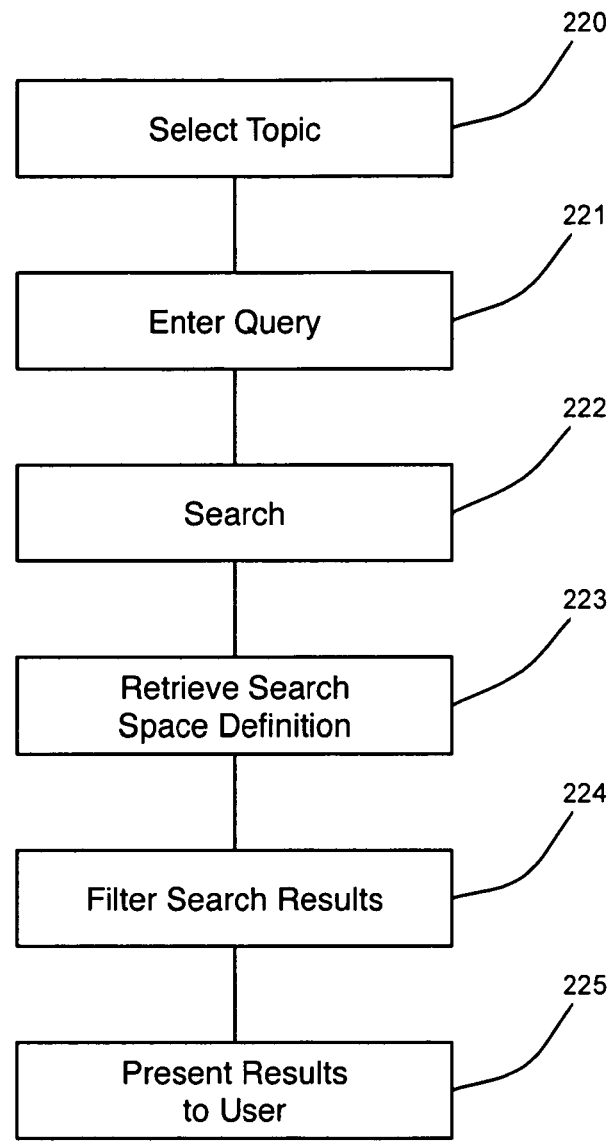
FIG. 7 depicts a topical search according to an embodiment of the invention.

In an alternative embodiment of the invention, a search engine conducts a search as if no topical search space as described herein has been specified, and then uses the definition of the desired search space to filter the results. Filtering search results according to such an embodiment of the invention is depicted in FIG. 7. In block 220, a user selects a topical area for the search. The nature of this selection will depend on the embodiment of the invention. In one embodiment, however, a user is presented with a hierarchical directory of topics and subtopics. By appropriate navigation, the user may select one or more topics relevant to the search.

In block 221, the user specifies the criteria for the search by entering a query. Many types of search queries are well known in the relevant arts, and include, for example, Boolean queries and natural-language based queries. In block 222, a search is performed across the entire document collection, producing, e.g., a list of results.

In block 223, the definition of the search space is retrieved, and in block 224, this definition is used to filter the results of the search from block 222. In an embodiment of the invention, the definition of the search space comprises normalized citations to every document comprised by the search space. Filtering the result in block 224 may comprise, for example, checking every document in the list of results against the definition of the search space and removing from the results any documents not found in that definition. Finally, in block 225, the filtered results of the search are presented to the user, who may then, in an embodiment of the invention, be able to retrieve and work with some or all of the documents comprised by the results.

The contents of the search space may be expected to depend heavily on the contents of the source document used to generate it. In an embodiment of the invention, a set of topical source documents is used as the basis for generating topical search spaces. Such a topical document (which may be referred to as a "law note") may, for example, be prepared by an expert in the field and may cite those sources judged to be most relevant to the topic.

For example, a particular law note may be a memorandum or article discussing, e.g., the application of principles of securities fraud to trading of debt securities by persons having material nonpublic information. Another law note may, for example, comprise a compilation of citations to laws and/or regulations regarding a particular topic, e.g., securities regulation. Another law note may be a directory of authorities judged particularly relevant to, e.g., securities regulation. Each such document may be written and maintained by one or more experts in securities law, and may cite the relevant statutory provisions and regulations and/or leading case law. Depending on the purpose for which the document was written, it may also cite many court opinions reflecting application of the principles discussed in the other authorities. In an embodiment of the invention, this article may be used as the source article in the generation of a search space when a user is looking for information about, e.g., insider trading of corporate bonds.

Figure 8:
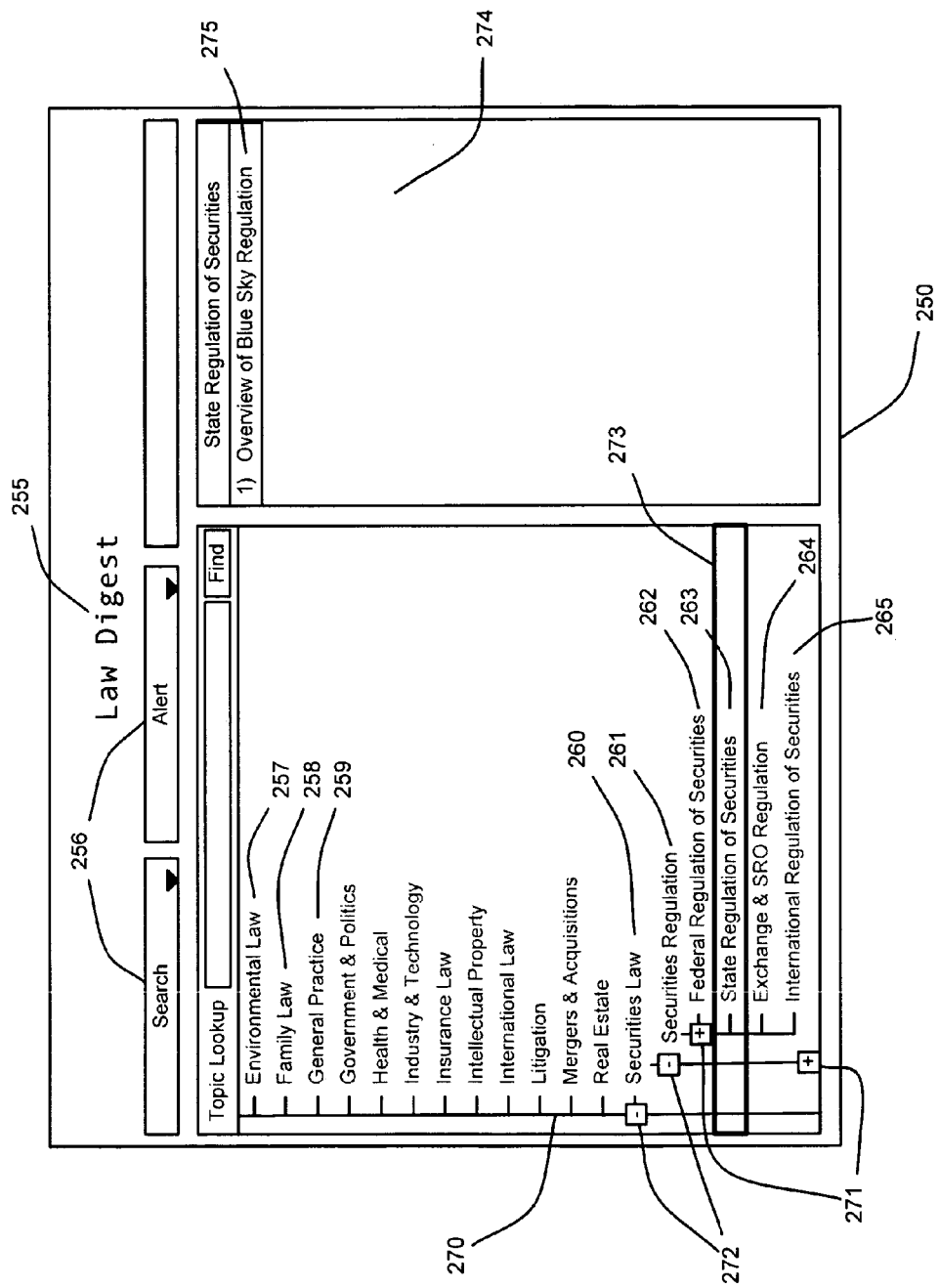
FIG. 8 depicts a user interface display from which a user may select a topic.

In an embodiment of the invention, a user may select a topic for searching from a screen 250 such as depicted in FIG. 8. A caption 255 may be present, indicating, e.g., the function of display, the collection of documents, and/or other information. The display may comprise, e.g., one or more menus 256 and/or other means for selecting one or more commands and/or additional functions.

One or more high-level topics may be displayed, such as, e.g., Environmental Law 257, Family Law 258, and Insurance Law 259. The organization of topics may be hierarchical, with one or more topics associated with one or more sub-topics, which may in turn be associated with one or more further sub-topics, and so on. (For ease of description "topic" comprises "sub-topic" as used herein.) For example, as depicted in FIG. 8, the topic Securities Law 260 is associated with the topic Securities Regulation 261, which is in turn associated with the topics Federal Regulation of Securities 262, State Regulation of Securities 263, Exchange & SRO Regulation 264, and International Regulation of Securities 265. In an embodiment of the invention, the organization may be polyarchical, in which any particular topic may be associated with more than one higher-level topic.

A tree 270 may be used to present the hierarchically-organized topics. An icon 271 may indicate the presence of one or more topics subsumed by a topic or topic. Icons 272 may also be provided that, when selected, cause all topics below a particular topic to be hidden.

Selection 273 of one or more topics and/or sub-topics may be reflected in the tree 270 by highlighting and/or other visual means. When a topic 263 is selected in the tree 270, names and/or titles 274 of one or more documents and/or directories of documents may be presented in a document area 275. In an embodiment of the invention, one or more law notes may be identified in the document area 275.

It is possible in an embodiment of the invention for a user to select multiple topics and/or subtopics to be searched simultaneously. In such an embodiment, the search space may be the union of the search spaces corresponding to each of the selected topics. For example, selecting the topic Securities Regulation 261 would result in a search space comprising the union of the search spaces corresponding to Federal Regulation of Securities 262, State Regulation of Securities 263, Exchange & SRO Regulation 264, and International Regulation of Securities 265. In an embodiment of the invention, multiple discrete items may be selected at the same time, e.g., General Practice 259 and State Regulation of Securities 265.

Figure 9:
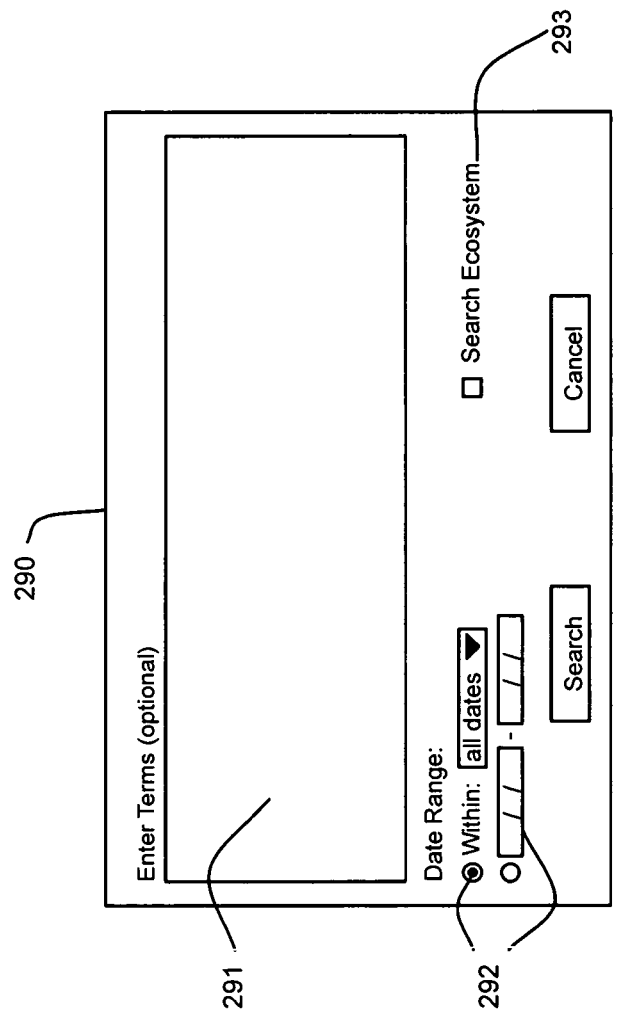
FIG. 9 depicts a user interface display from which a user may enter a search query.

A search function may be provided, and FIG. 9 depicts a display 290 from which a user may enter a search query in an embodiment of the invention. A text area 291 may be present, displaying a query as it is entered and/or edited. One or more controls 292 may also be present, allowing the search to be restricted, e.g., by date, document type, jurisdiction, and/or other criteria.

A control 293 may allow the user to select the scope of the search. For example, the search may be limited to the text of one or more documents presented in the document area 275 (FIG. 8). Alternatively, a search may be specified of a search space defined in accordance with the invention, as described above. In an embodiment of the invention, the source document used to construct the search space may be one or more law notes associated with the selected topic or topics and/or any sub-topics comprised by the one or more sub-topics.

In an embodiment of the invention, the user may be provided with one or more controls (not pictured) allowing specification of the level of search space to be used. In another embodiment of the invention, the level associated with some or all topics and/or source documents may be fixed. For example, it may be determined that, when a source document is a law note that comprises compiled references to statutes and regulations, a level-3 search space provides optimum coverage of the topic, which may mean, e.g., that such a search space is most likely to incorporate relevant material without overinclusion. (The use of a level-3 search space in this example is meant to be purely exemplary, and should not be taken to limit the invention, even when the source document is a law note as described herein.)

The invention has been described above in connection with certain preferred embodiments. This description is purely illustrative and not limiting, and other embodiments of the invention will be apparent to those skilled in the relevant arts.

The invention claimed is:

1. A computer system for identifying one or more electronic documents within a collection of electronic documents, the system comprising:
   one or more processors programmed at least to (1) store, in a memory operatively coupled to at least one of the processors, a search level that is a whole number that is at least two,
   (2) accept a search query through an interface operatively coupled to at least one of the processors, the search query comprising one or more criteria that a user has explicitly entered, and the search query having an association with a topical area for a search,
   (3) define a subset of a collection of electronic documents, the subset comprising a plurality of electronic documents,
   (4) execute the search query against all documents in the subset, thereby identifying as responsive documents all documents in the subset that satisfy the entire query such that each responsive document includes each of the one or more criteria of the search query,
   (5) retrieving a definition of a search space, the definition of the search space comprising one or more normalized citations to every document within the search space, and the search space having an association with the topical area for the search;
   (6) filtering the responsive documents resulting from the execution of the search query by checking each responsive document against the definition of the search space and removing from further consideration an responsive document not found in the definition of the search space; and (7) provide information that identifies one or more of the remaining responsive documents through an interface operatively coupled to at least one of the processors;

wherein the subset comprises one or more source documents within the collection and one or more additional documents within the collection, the one or more additional documents being identifiable by a process carried out for a number of iterations equal to the search level and comprising:

(1) a first iteration that comprises finding one or more references in one or more of the electronic source documents, each of the references identifying a respective document in the collection, and adding to the subset each document in the collection that is identified by any of the found references but is not already in the subset, and (2) one or more subsequent iterations, each of which comprises finding one or more references in one or more of the documents added to the subset in the immediately previous iteration, each of the references identifying a respective document in the collection, and adding to the subset each document in the collection that is identified by any of the found references but is not already in the subset.

2. The computer system of claim 1, wherein:

the one or more processors are programmed at least to compute rankings of the identified responsive documents, the computed ranking of each respective identified responsive document depending at least upon the iteration in which that document would first be added to the subset, and provide information that identifies a plurality of the responsive documents through an interface operatively coupled to at least one of the processors; and the provided information that identifies a plurality of the responsive documents comprises information about the ranking of the identified documents.

3. The computer system of claim 1, wherein the search query is a Boolean query that the user has entered.

4. The computer system of claim 1: wherein the search query is a natural-language query that the user has entered.

5. A computer system for identifying one or more electronic documents within a collection of electronic documents, the system comprising:

one or more processors programmed at least to (1) store in a memory operatively coupled to a least one of the processors, a search level that is a whole number that is at least two, (2) accept a search query through an interface operatively coupled to at least one of the processors, the search query comprising one or more criteria that a user has explicitly entered, and the search query having an association with a topical area for a search, (3) define a subset of a collection of electronic documents that comprises plurality of electronic documents, (4) execute the search query against all documents in the subset, thereby identifying as responsive documents all documents in the subset that satisfy the query such that each responsive document includes each of the one or more criteria of the search query, (5) retrieve a definition of a search space, the definition of the search space comprising one or more normalized citations to every document within the search space, and the search space having an association with the topical area for the search;

(6) filter the responsive documents resulting from the execution of the search query by checking each responsive document against the definition of the search space and removing from further consideration an responsive document not found in the definition of the search space; (7) provide information that identifies one or more of the remaining responsive documents through an interface operatively coupled to at least one of the processors;

wherein the subset comprises one or more source documents within the collection and one or more additional documents within the collection, the one or more additional documents being identifiable by a process carried out for a number of iterations equal to the search level and comprising:

(1) a first iteration that comprises finding one or more citing documents within the collection, each citing document comprising at least one reference to at least one of the electronic source documents, and adding to the subset each of the found citing documents that is not already in the subset, and (2) one or more subsequent iterations, each of which comprises finding one or more citing documents within the collection, each citing document comprising at least one reference to at least one of the documents added to the subset in the immediately previous iteration, and adding to the subset each of the found citing documents that is not already in the subset.

6. The computer system of claim 5, wherein:

the one or more processors are programmed at least to compute ranking of the identified responsive documents, the computed ranking of each respective identified responsive document depending at least upon the iteration in which that document would first be added to the subset, and provide information that identifies a plurality of the responsive documents through an interface operatively coupled to at least one of the processors; and the provided information that identifies a plurality of the responsive documents comprises information about the ranking of the identified documents.

7. The computer system of claim 5, wherein the search query is a Boolean query that the user has entered.

8. The computer system of claim 5, wherein the search query is a natural language query that the user has entered.

9. A method of identifying one or more documents within a collection of documents, the method being performed by a computer system that comprises one or more processors, a memory operatively coupled to at least one of the processors, and a computer-readable storage medium encoded with instructions executable by at least one of the processors and operatively coupled to at least one of the processors, the method comprising:

storing in the memory a search level that is a whole number that is at least two; storing in the memory a definition of a subset of a collection of electronic documents, the collection of documents comprising a plurality of documents, and the subset comprising one or more source documents within the collection and one or more additional documents within the collection, the one or more additional documents being identifiable by a process carried out for a number of iterations equal to the search level and comprising:

(1) a first iteration that comprises finding one or more references in one or more of the electronic source documents, each of the references identifying a respective document in the collection, and adding to the subset each document in the collection that is identified by any of the found references but is not already in the subset, and (2) one or more subsequent iterations, each of which comprises finding one or more references in one or more of the documents added to the subset in the immediately previous iteration, each of the references identifying a respective document in the collection, and adding to the subset each document in the collection that is identified by any of the found references but is not already in the subset;

at least one of the processors receiving through at least one interface operatively coupled to the processor a definition of a search query through an interlace operatively coupled to at least one of the processors, the search query comprising one or more criteria that a user has explicitly entered, and the search query having an association with a topical area for a search;

at least one of the processors executing instructions retrieved from the computer-readable storage medium to (i) identify all responsive documents within the subset that satisfy the one or more criteria comprised by the search query such that each responsive document includes each of the one or more criteria of the search query, (ii) retrieve a definition of a search space, the definition of the search space comprising one or more normalized citations to every document within the search space, and the search space having an association with the topical area for the search, (iii) filter the responsive documents resulting from the execution of the search query by checking each responsive document against the definition of the search space and (iv) removing from further consideration an responsive document not found in the definition of the search space; and at least one of the processors executing instructions retrieved from the computer-readable storage medium to transmit through the at least one interface information for display to the user that identifies one or more of the remaining responsive documents.

10. The method of claim 9, comprising:
at least one of the processors executing instructions retrieved from the computer-readable storage medium to compute rankings of the identified responsive documents, the computed ranking of each respective identified responsive document depending at least upon the iteration in which that document would first be added to the subset; and at least one of the processors executing instructions retrieved from the computer-readable storage medium to transmit through one of the interfaces information that identifies a plurality of the responsive documents; wherein the provided information that identifies a plurality of the responsive documents comprises information about the ranking of the identified documents.

11. The method of claim 9, wherein the search query is a Boolean query that the user has entered.

12. The method of claim 9, wherein the search query is a natural-language query that the user has entered.

13. A method of identifying one or more document within a collection of documents, the method being performed by a computer system that comprises one or more processors, a memory operatively coupled to at least one of the processors, and a computer-readable storage medium encoded with instructions executable by at least one of the processors and operatively coupled to at least one of the processors, the method comprising:

storing in the memory a search level that is a whole number that is at least two;

storing in the memory a definition of a subset of a collection of electronic documents, the collection of documents comprising a plurality of documents, and the subset comprising one or more source documents within the collection and one or more additional documents within the collection, the one or more additional documents being identifiable by a process carried out for a number of iterations equal to the search level and comprising:

(1) a first iteration that comprises finding one or more citing documents within the collection, each citing document comprising at least one reference to at least one of the electronic source documents, and adding to the subset each of the found citing documents that is not already in the subset, and (2) one or more subsequent iterations, each of which comprises finding one or more citing documents within the collection, each citing document comprising at least one reference to at least one of the documents added to the subset in the immediately previous iteration, and adding to the subset each of the found citing documents that is not already in the subset, at least one of the processors receiving through at least one interface operatively coupled to the processor a definition of a search query through an interface operatively coupled to at least one of the processors, the search query comprising one or more criteria that a user has explicitly entered, and the search query having an association with a topical area for a search;

at least one of the processors executing instructions retrieved from the computer readable storage medium to (i) identify all responsive documents within the subset that satisfy the one or more criteria comprised by the search query such that each responsive document includes each of the one or more criteria of the search query, (ii) retrieve a definition of a search space, the definition of the search space comprising one or more normalized citations to every document within the search space, and the search space having an association with the topical area for the search, (iii) filter the responsive documents resulting from the execution of the search query by checking each responsive document against the definition of the search space and (iv) removing from further consideration an responsive document not found in the definition of the search space; at least one of the processors executing instructions retrieved from the computer-readable storage medium to transmit through the at least one interface information for display to the user that identifies one or more of the remaining responsive documents.

14. The method of claim 13, comprising:
at least one of the processors executing instructions retrieved from the computer-readable storage medium to compute rankings of the identified responsive documents, the computed ranking of each respective identified responsive document depending at least upon the iteration in which that document would first be added to the subset; and at least one of the processors executing instructions retrieved from the computer-readable storage medium to transmit through one of the interfaces information that identifies a plurality of the responsive documents;

wherein the provided information that identifies a plurality of the responsive documents comprises information about the ranking of the identified documents.

15. The method of claim 13, wherein the search query is a Boolean query that the user has entered.

16. The method of claim 13, wherein the search query is a natural-language query that the user has entered.

17. A computer program product comprising a computer-readable storage medium encoded with instructions that, when executed by at least one processor within a computer system that comprises one or more processors and a memory operatively coupled to at least one of the processors, cause the computer system at least to:

store in the memory a search level that is a whole number that is at least two; store in the memory a definition of a subset of a collection of electronic documents, the collection of documents comprising a plurality of documents, and the subset comprising one or more source documents within the collection and one or more additional documents within the collection, the one or more additional documents being identifiable by a process carried out for a number of iterations equal to the search level and comprising:

(1) a first iteration that comprises finding one or more references in one or more of the electronic source documents, each of the references identifying a respective document in the collection, and adding to the subset each document in the collection that is identified by any of the found references but is not already in the subset, and (2) one or more subsequent iterations, each of which comprises finding one or more references in one or more of the documents added to the subset in the immediately previous iteration, each of the references identifying a respective document in the collection, and adding to the subset each document in the collection that is identified by any of the found references but is not already in the subset;

receive through at least one interface operatively coupled to at least one of the processors a definition of a search query through an interface operatively coupled to at least one of the processors, the search query comprising one or more criteria that a user has explicitly entered, and the search query having an association with a topical area for a search;

identify all responsive documents within the subset that satisfy the one or more criteria comprised by the search query such that each responsive document includes each of the one or more criteria of the search query, and retrieve a definition of a search space, the definition of the search space comprising one or more normalized citations to every document within the search space, and the search space having an association with the topical area for the search;

filter the responsive documents resulting from the execution of the search query by checking each responsive document against the definition of the search space and removing from further consideration an responsive document not found in the definition of the search space; transmit through the at least one interface information for display the user that identifies one or more of the remaining responsive documents.

18. Tile computer program product of claim 17, wherein the instructions comprise instructions that, when executed by at least one of the processors, cause the computer system at least to compute rankings of the identified responsive documents, the computed ranking of each respective identified responsive document depending at least upon the iteration in which that document would first be added to the subset; and transmit through one of the interlaces information that identifies a plurality of the responsive documents;

wherein the provided information that identifies a plurality of the responsive documents comprises information about the ranking of the identified documents.

19. The computer-readable storage medium of claim 17, wherein the search query is a Boolean query that the user has entered.

20. The computer-readable storage medium of claim 17, wherein the search query is a natural language query that the user has entered.

21. A computer program product comprising a computer-readable storage medium encoded with instructions that, when executed by at least one processor within a computer system that comprises one or more processors and a memory operatively coupled to at least one of the processors, cause the computer system at least to:

store in the memory a search level that is a whole number that is at least two;

store in the memory a definition of a subset of a collection of electronic documents, the collection of documents comprising a plurality of documents, and the subset comprising one or more source documents within the collection and one or more additional documents within the collection, the one or more additional documents being identifiable by a process carried out for a number of iterations equal to the search level and comprising:

(1) a first iteration that comprises finding one or more citing documents within the collection, each citing document comprising at least one reference to at least one of the electronic source documents, and adding to the subset each of the found citing documents that is not already in the subset, and (2) one or more subsequent iterations, each of which comprises finding one or more citing documents within the collection, each citing document comprising at least one reference to at least one of the documents added to the subset in the immediately previous iteration, and adding to the subset each of the found citing documents that is not already in the subset, receive through at least one interface operatively coupled to at least one of the processors a definition of a search query through an interface operatively coupled to at least one of the processors, the search query comprising one or more criteria that a user has explicitly entered, and the search query having an association with a topical area for a search;

identify all responsive documents within the subset that satisfy the one or more criteria comprised by the search query such that each responsive document includes each of the one or more criteria of the search query, and retrieve a definition of a search space, the definition of the search space comprising one or more normalized citations to every document within the search space, and the search space having an association with the topical area for the search;

filter the responsive documents resulting from the execution of the search query by checking each responsive document against the definition of the search space and removing from further consideration an responsive document not found in the definition of the search space; transmit through the at least one interface information for display the user that identifies one or more of the remaining responsive documents.

22. The computer program product of claim 21, wherein the instructions comprise instructions that, when executed by at least one of the processors, cause the computer system at least to:
compute rankings of the identified responsive documents, the computed ranking of each respective identified responsive document depending at least upon the iteration in which that document would first be added to the subset; and
transmit through one of the interfaces information that identifies a plurality of the responsive documents;
wherein the provided information that identifies a plurality of the responsive documents comprises information about the ranking of the identified documents.

23. The computer-readable storage medium of claim 21, wherein the search query is a Boolean query that the user has entered.

24. The computer-readable storage medium of claim 21, wherein the search query is a natural language query that the user has entered.

* * * * *